(12) United States Patent
Lin

(10) Patent No.: US 6,193,263 B1
(45) Date of Patent: Feb. 27, 2001

(54) SEAT POSITIONING FRAME OF A STROLLER

(76) Inventor: Wan-Hsin Lin, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/357,111

(22) Filed: Jul. 19, 1999

(51) Int. Cl.[7] .................. B62B 7/08; A47C 7/02
(52) U.S. Cl. .................. 280/643; 280/62; 280/30; 280/648; 280/47.18; 297/130
(58) Field of Search .................. 280/643, 642, 280/647, 648, 644, 646, 650, 47.18, 62, 30, 641; 297/130

(56) References Cited

U.S. PATENT DOCUMENTS

| | | | |
|---|---|---|---|
| 2,425,688 | * 8/1947 | Schulte | 297/130 |
| 2,961,248 | * 11/1960 | Meyers | 280/641 |
| 4,620,711 | * 11/1986 | Dick | 280/30 |
| 5,695,212 | * 12/1997 | Hinkston | 280/642 |
| 5,842,713 | * 12/1998 | Barnes et al. | 280/642 |
| 5,934,757 | * 8/1999 | Smith | 280/642 |
| 6,036,220 | * 3/2000 | Zhen | 280/642 |
| 6,053,525 | * 4/2000 | Lin | 280/642 |

* cited by examiner

*Primary Examiner*—Michael Mar
*Assistant Examiner*—Hau Phan

(57) ABSTRACT

A stroller has two handle push rods, two front wheel support rods, two rear wheel support rods, two base rods, and two pivot joints. Each pivot joint is connected to the respective handle push rod, the respective front wheel support rod, and the respective rear wheel support rod. A seat positioning frame is disposed on the stroller. The seat positioning frame has a transverse frame and a longitudinal frame. The longitudinal frame is connected to the transverse frame. The longitudinal frame and the base rods are fastened by connectors. The transverse frame and the handle push rods are fastened by fasteners.

3 Claims, 4 Drawing Sheets

SEAT POSITIONING FRAME OF A STROLLER

BACKGROUND OF THE INVENTION

The present invention relates to a seat positioning frame of a stroller. More particularly, the present invention relates to a seat positioning frame of a stroller which can be disposed on a stroller stably.

A conventional stroller has a large seat which is not suitable for a small baby. It is dangerous to place a small seat on the conventional stroller if the small seat cannot be fastened on the conventional stroller stably.

SUMMARY OF THE INVENTION

An object of the present invention is to provide a seat positioning frame which can be disposed on a stroller stably.

Another object of the present invention is to provide a seat positioning frame which can be detached from a stroller easily.

Accordingly, a stroller comprises two handle push rods, two front wheel support rods, two rear wheel support rods, two base rods, and two pivot joints. Each of the pivot joints is connected to the respective handle push rod, the respective front wheel support rod, and the respective rear wheel support rod. A seat positioning frame is disposed on the stroller. The seat positioning frame comprises a transverse frame and a longitudinal frame. The longitudinal frame and the base rods are fastened by connectors. The transverse frame has two transverse pipes, two transverse tubes, and four T-shaped joints. Each of the T-shaped joints is connected to the respective transverse pipe and the respective transverse tube. The transverse pipes and the handle push rods are fastened by two fasteners. The longitudinal frame has two longitudinal rods connected to one of the transverse tubes, two connectors, and two insertion devices. Each of the connectors is inserted in a bottom of the respective longitudinal rod. Each of the connectors has a protruded end and a through hole formed on the protruded end. Each of the insertion devices has a generally U-shaped wire and a plug connected to the generally U-shaped wire. The plug is inserted through the respective through hole and a through aperture of the respective base rod.

DETAILED DESCRIPTION OF THE INVENTION

Figure 1:
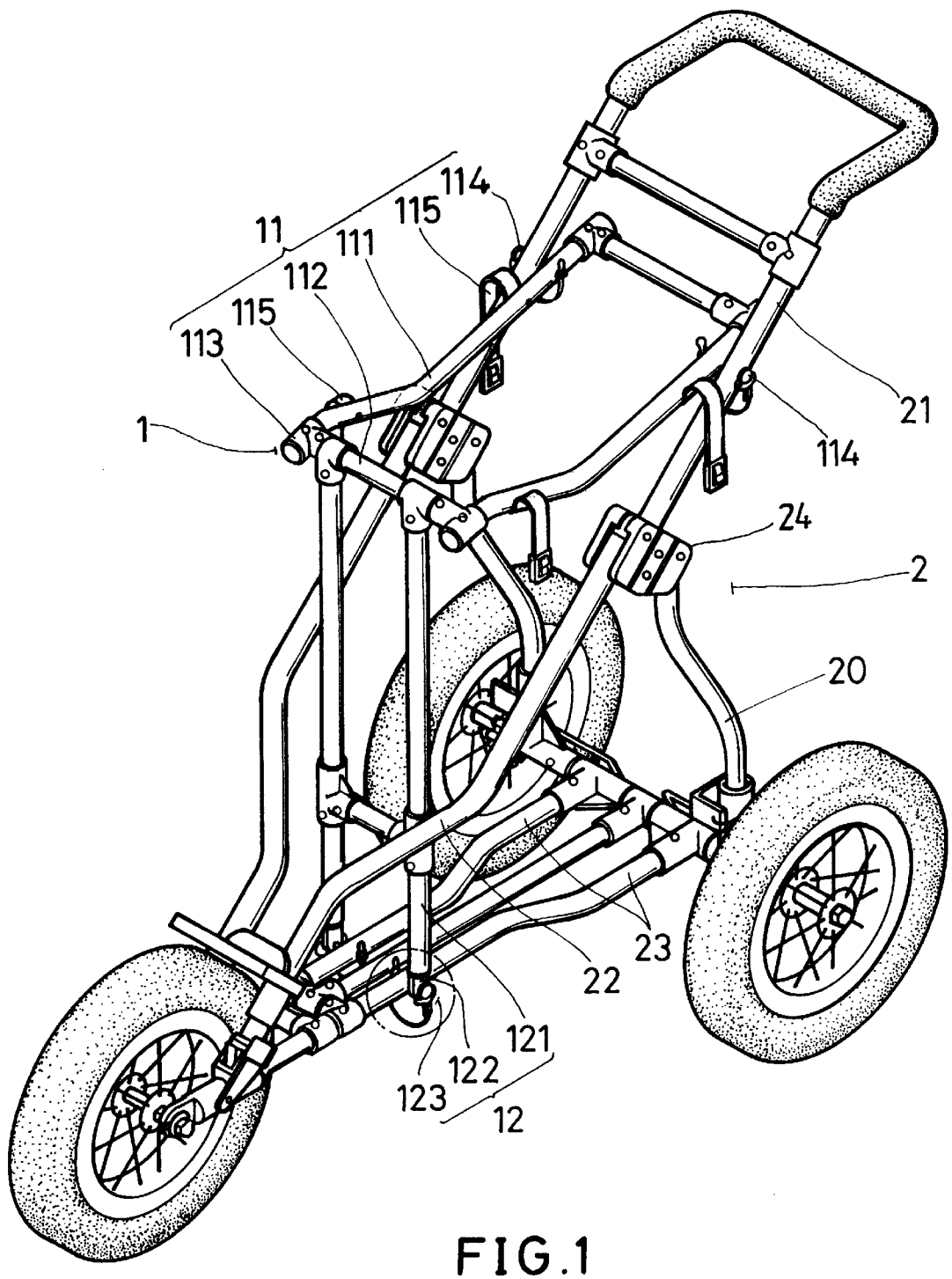
FIG. 1 is a perspective assembly view of a seat positioning frame disposed on a stroller of a preferred embodiment in accordance with the present invention.
Figure 2:
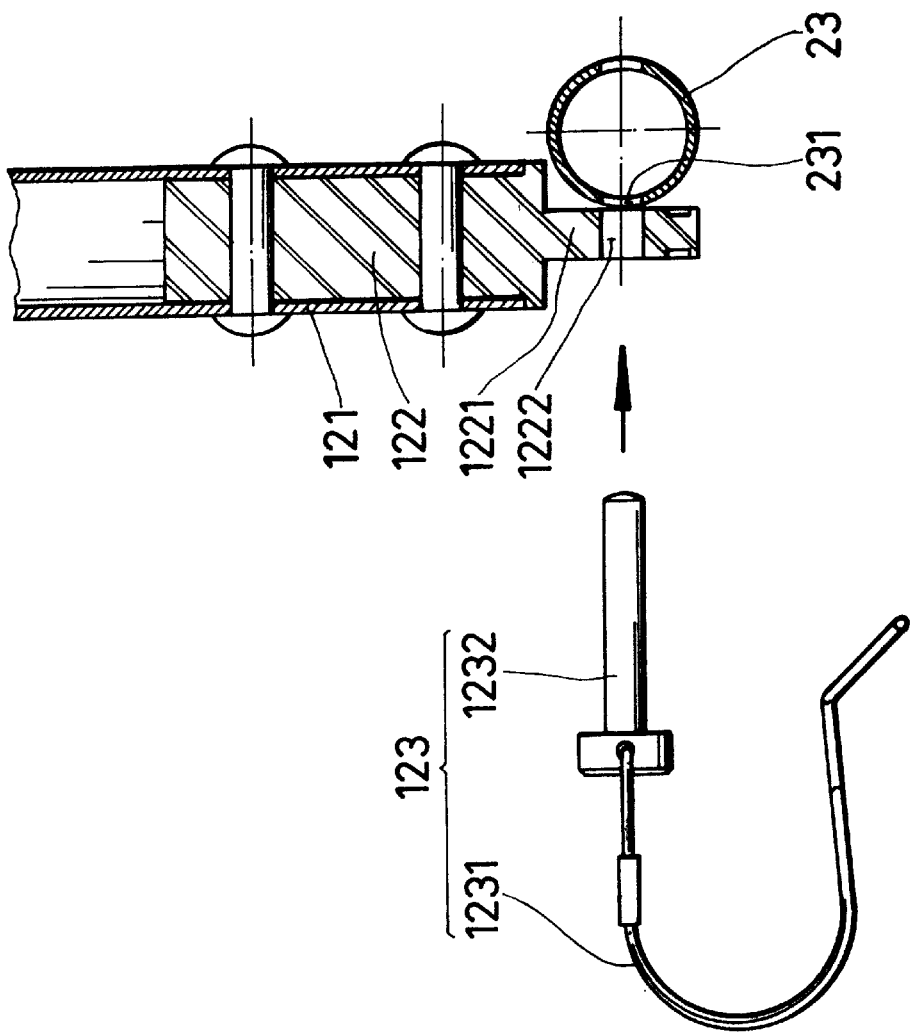
FIG. 2 is a schematic view illustrating an insertion device, a longitudinal rod, and a base rod before the insertion device inserted through the longitudinal rod and the base rod.
Figure 4:
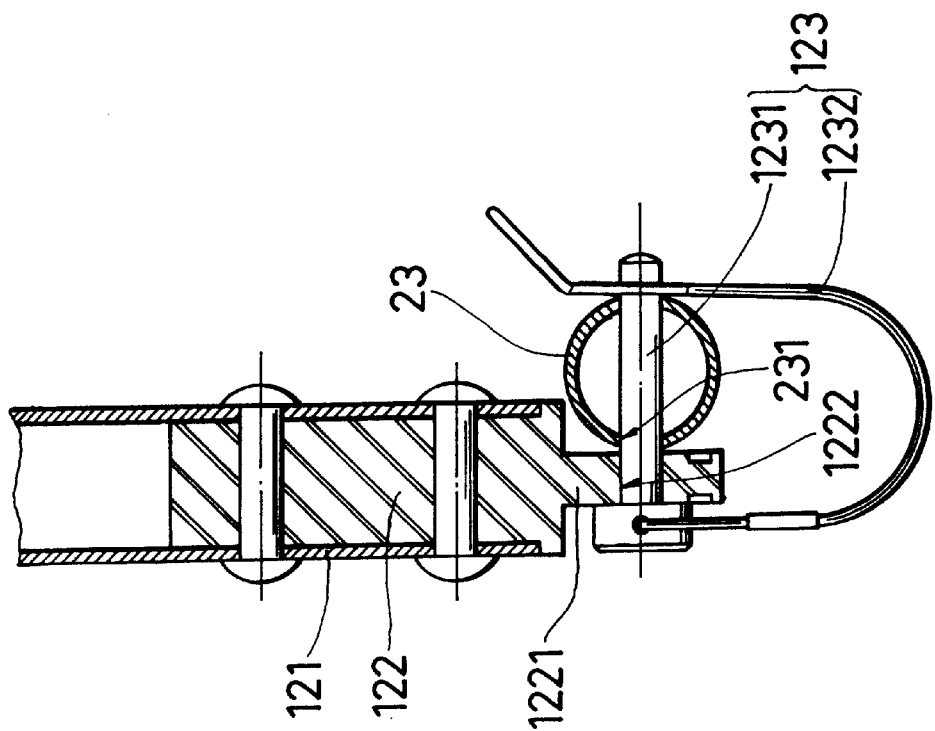
FIG. 4 is another schematic view illustrating an insertion device inserted through a longitudinal rod and a base rod.
Figure 3:
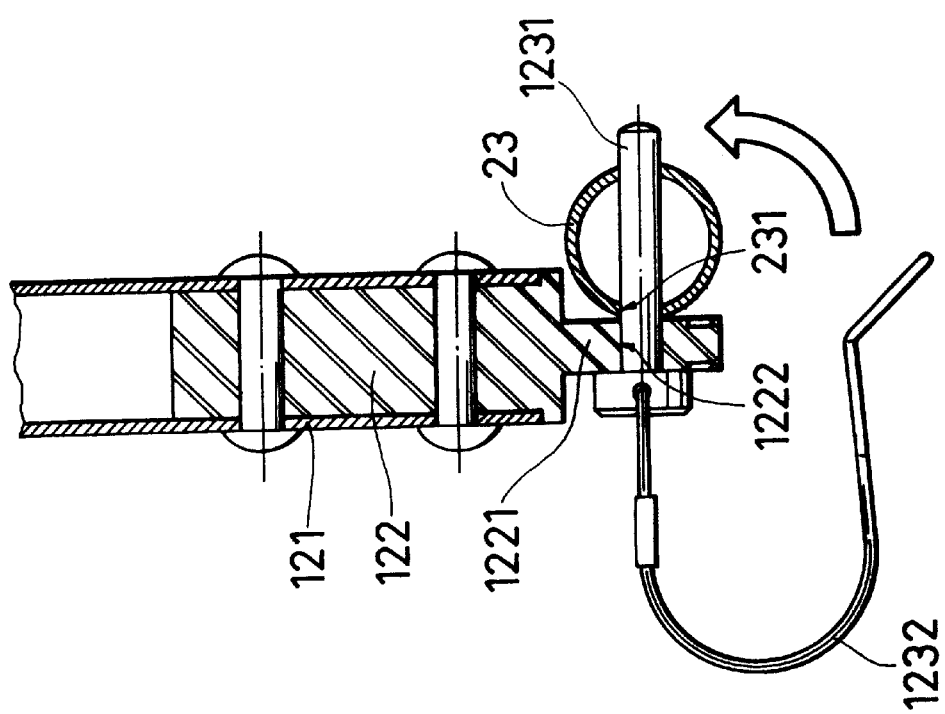
FIG. 3 is a schematic view illustrating an insertion device inserted through a longitudinal rod and a base rod.
Figure 5:
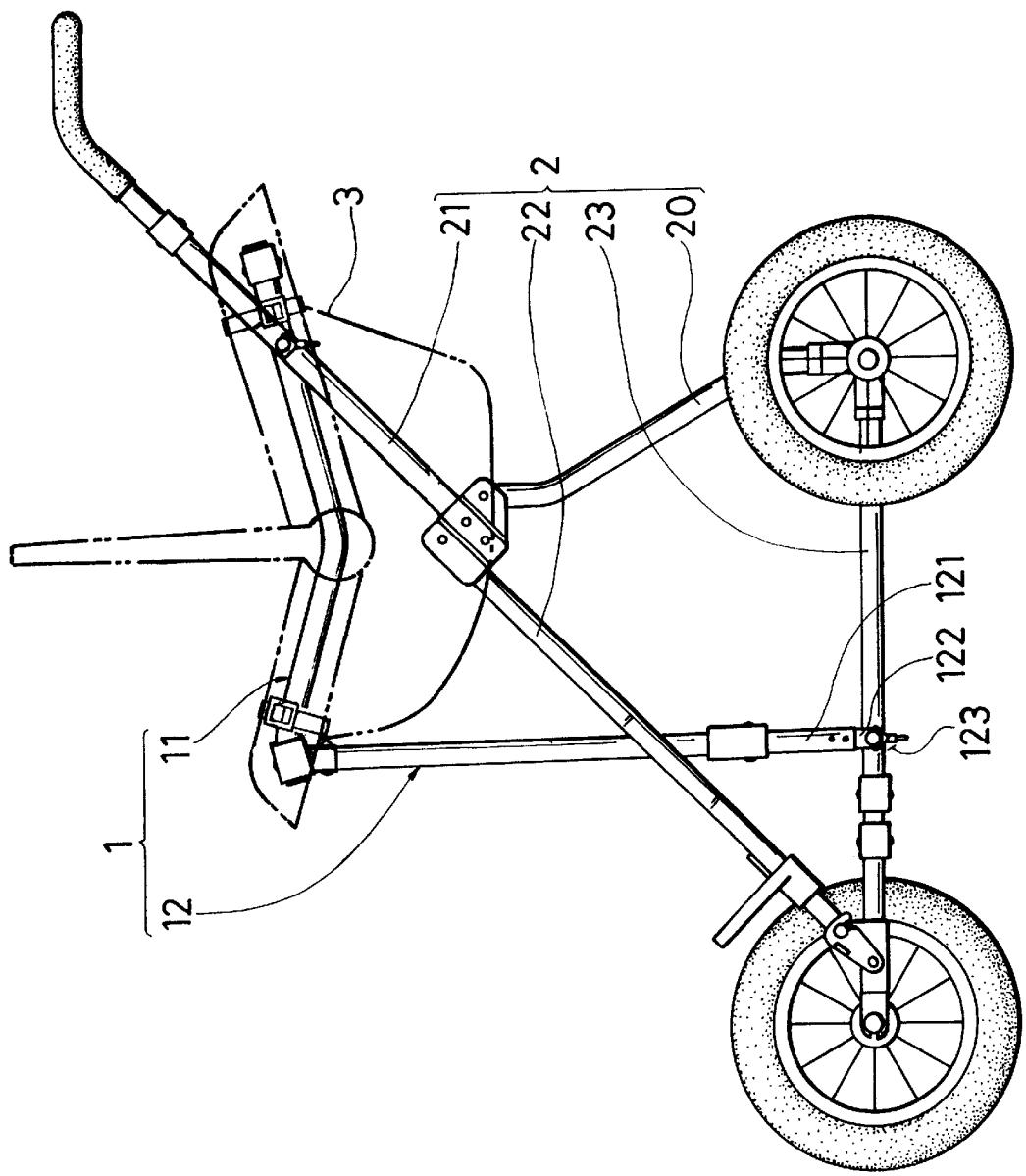
FIG. 5 is an elevational view of a seat positioning frame disposed on a stroller of a preferred embodiment in accordance with the present invention.

Referring to FIGS. 1 to 5, a stroller 2 comprises two handle push rods 21, two front wheel support rods 22, two rear wheel support rods 20, two base rods 23, and two pivot joints 24. Each of the pivot joints 24 is connected to the respective handle push rod 21, the respective front wheel support rod 22, and the respective rear wheel support rod 20.

A seat positioning frame 1 is disposed on the stroller 2. The seat positioning frame 1 comprises a transverse frame 11 and a longitudinal frame 12.

The longitudinal frame 12 and the base rods 23 are fastened by connectors 122.

The transverse frame 11 has two transverse pipes 111, two transverse tubes 112, and four T-shaped joints 113.

Each of the T-shaped joints 113 is connected to the respective transverse pipe 111 and the respective transverse tube 112.

The transverse pipes 111 and the handle push rods 21 are fastened by two fasteners 114.

The longitudinal frame 12 has two longitudinal rods 121 connected to one of the transverse tubes 112, two connectors 122, and two insertion devices 123.

Each of the connectors 122 is inserted in a bottom of the respective longitudinal rod 121. Each of the connectors 122 has a protruded end 1221 and a through hole 1222 formed on the protruded end 1221.

Each of the insertion devices 123 has a generally U-shaped wire 1231 and a plug 1232 connected to the generally U-shaped wire 1231.

The plug 1232 is inserted through the respective through hole 1222 and a through aperture 231 of the respective base rod 23.

A seat 3 is disposed on the seat positioning frame 1 and positioned by the seat positioning frame 1.

A plurality of fastening belts 115 are disposed on the respective transverse pipe 111 to fasten the seat 3.

When the fasteners 114 and the insertion devices 123 are removed, the seat positioning frame 1 can be detached from the stroller 2 easily so that the stroller 2 remains as a conventional stroller.

When the insertion devices 123 are removed, the longitudinal rods 121 are detached from the base rods 23. The longitudinal rods 121 are rotated upward while the stroller 2 is collapsed. However, it is not a featured function of the present invention to collapse the stroller.

The present invention has the following advantages. The seat positioning frame can be disposed on a conventional stroller stably. The seat positioning frame can be detached from a conventional stroller easily. The seat positioning frame can be collapsed after the insertion devices are removed.

The invention is not limited to the above embodiment but various modification thereof may be made. Further, various changes in form and detail may be made without departing from the scope of the invention.

I claim:

1. A stroller comprising two handle push rods, two front wheel support rods, two rear wheel support rods, two base rods, and two pivot joints, each of the pivot joints being connected to a respective handle push rod, a respective front wheel support rod, and a respective rear wheel support rod, characterized in that:

a seat positioning frame being disposed on the stroller, the seat positioning frame comprises transverse frame members and longitudinal frame members, the longitudinal frame members and the base rods being fastened together by a plurality of connectors the transverse frame members include two laterally spaced transverse pipes, two longitudinally spaced transverse tubes, and four T-shaped joints, each of the T-shaped joints being connected to a respective transverse pipe and a respective transverse tube, the transverse pipes and the handle push rods being fastened by two fasteners, the longitudinal frame members include two longitudinal rods, two connectors and two insertion devices, each of the two longitudinal rods having upper ends which are connected to one of the transverse tubes, each of the connectors being inserted into a bottom end of a respective longitudinal rod, each of the connectors having a protruded end and a through hole formed in the protruded end; and each of the insertion devices includes a generally U-shaped wire and a plug connected to the generally U-shaped wire;

wherein the plug of each insertion device is insertable through a respective through hole and through an aperture of a respective base rod for releasably securing the longitudinal rod to the base rod.

2. The stroller as claimed in claim 1, wherein a seat is disposed on the seat positioning frame.

3. The stroller as claimed in claim 2, wherein a plurality of fastening belts are disposed on respective transverse pipes.

* * * * *